(12) United States Patent
Ewaldsson

(10) Patent No.: US 11,396,931 B2
(45) Date of Patent: Jul. 26, 2022

(54) TWISTED STRING TRANSMISSION

(71) Applicant: BIOSERVO TECHNOLOGIES AKTIEBOLAG, Kista (SE)

(72) Inventor: Martin Oskar Gustaf Ewaldsson, Sigtuna (SE)

(73) Assignee: BIOSERVO TECHNOLOGIES AKTIEBOLAG, Kista (SE)

( * ) Notice: Subject to any disclaimer, the term of this patent is extended or adjusted under 35 U.S.C. 154(b) by 0 days.

(21) Appl. No.: 17/052,971

(22) PCT Filed: May 16, 2019

(86) PCT No.: PCT/EP2019/062671
§ 371 (c)(1),
(2) Date: Nov. 4, 2020

(87) PCT Pub. No.: WO2019/224104
PCT Pub. Date: Nov. 28, 2019

(65) Prior Publication Data
US 2021/0108707 A1  Apr. 15, 2021

(30) Foreign Application Priority Data
May 21, 2018 (SE) .................................. 1850594-1

(51) Int. Cl.
*F16H 19/06* (2006.01)
(52) U.S. Cl.
CPC .............................. *F16H 19/0654* (2013.01)
(58) Field of Classification Search
CPC .................................................. F16H 19/0654
See application file for complete search history.

(56) References Cited

U.S. PATENT DOCUMENTS

| | | | | |
|---|---|---|---|---|
| 3,864,983 A | * | 2/1975 | Jacobsen | F16H 21/54 74/89 |
| 4,593,571 A | * | 6/1986 | Schwarz | F16H 19/0622 74/89.2 |
| 4,843,921 A | | 7/1989 | Kremer | |
| 9,574,646 B1 | | 2/2017 | Edsinger | |
| 2009/0249903 A1 | * | 10/2009 | Godler | F16H 19/0654 74/89.2 |
| 2014/0277739 A1 | * | 9/2014 | Kornbluh | G16Z 99/00 700/260 |
| 2017/0365426 A1 | * | 12/2017 | Bachmaier | H01H 33/666 |
| 2018/0085277 A1 | * | 3/2018 | Julin | A61F 5/0102 |
| 2018/0266495 A1 | * | 9/2018 | Kim | F16D 23/02 |
| 2018/0298996 A1 | * | 10/2018 | Ryu | G01D 5/12 |

OTHER PUBLICATIONS

International Search Report from corresponding International Application No. PCT/EP2019/062671, dated Sep. 4, 2019, 2 pages.
Wurtz, T. et al., "The Twisted String Actuation System: Modeling and Control," 2010 IEEE/ASME International Conference on Advanced Intelligent Mechatronics (AIM), pp. 1215-1220, dated Jul. 6, 2010.
International Preliminary Report on Patentability from corresponding International Application No. PCT/EP2019/062671, dated Oct. 12, 2020, 18 pages.

\* cited by examiner

*Primary Examiner* — William Kelleher
*Assistant Examiner* — Gregory T Prather
(74) *Attorney, Agent, or Firm* — Tucker Ellis LLP

(57) ABSTRACT

A twisted string transmission for converting a rotational motion to a linear motion is provided, comprising a motor (1) and a string (2) to be connectable to a load (3). The string (2) has a variable diameter along its length.

19 Claims, 4 Drawing Sheets

Fig 1a
PRIOR ART
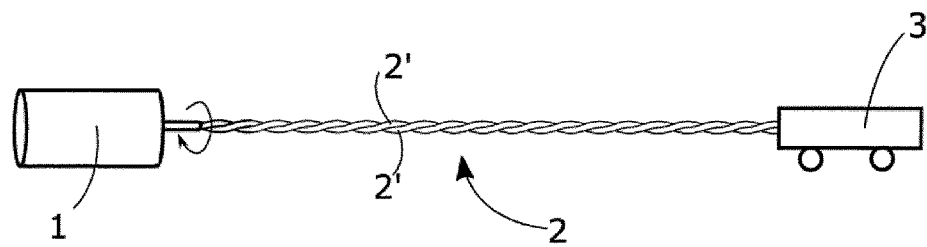
Fig 1b
PRIOR ART
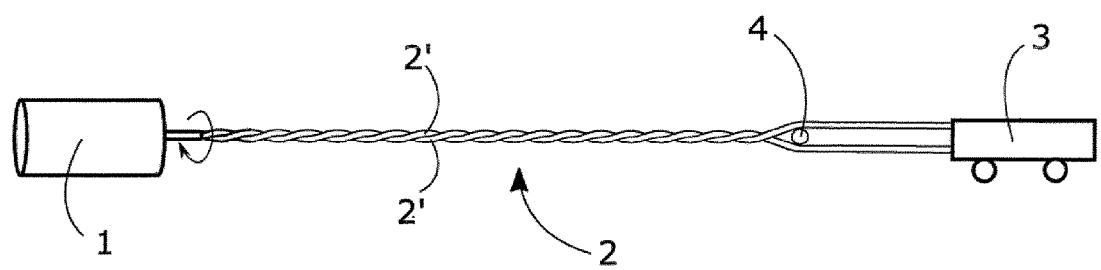
Fig 2a-f
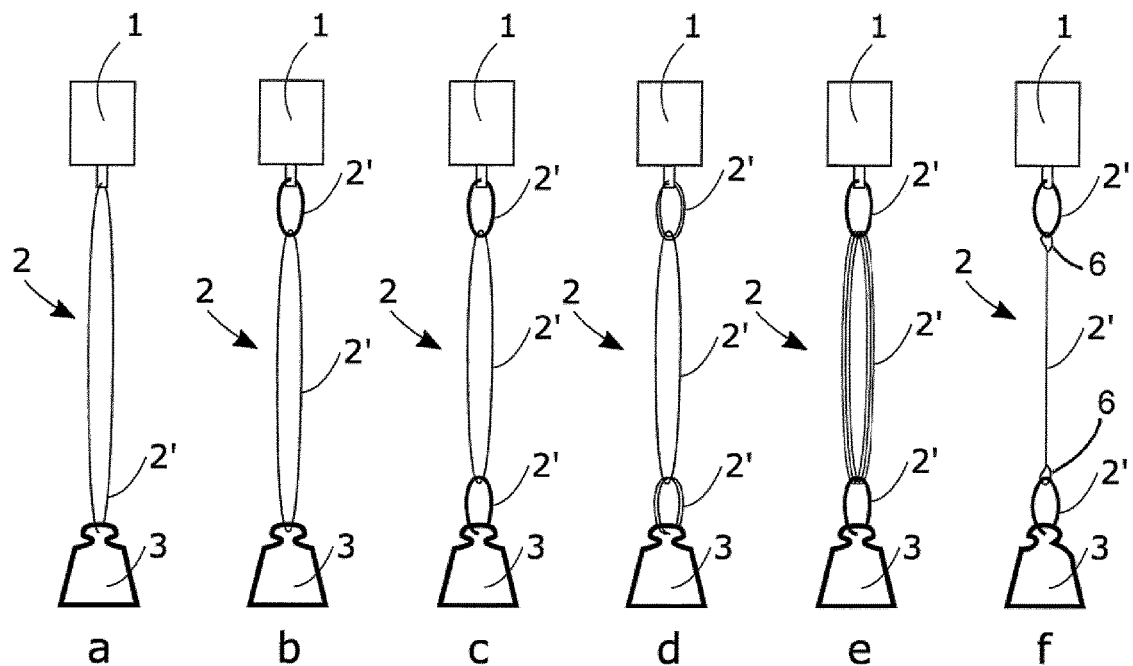

TWISTED STRING TRANSMISSION

The present invention concerns a twisted string transmission for converting rotational motion to linear motion. It comprises a motor and a string to be connectable to a load.

TECHNICAL FIELD

Twisted string transmissions are used mostly in robotics, and the present applicant is working in the field of bionic technology robotics.

BACKGROUND

A problem with twisted string transmissions is the wear of the string, especially at the attachment point to the motor and to the load, or at a split, in those cases a split is dividing a string having at least two threads are used in the transmission. The threads are prevented from being twisted by the split towards the load. At these points stress concentrations are present due to the winding and unwinding of the strings. Abrasion occur at the string, which will weaken the string. At the end the string will break and cause failure of the twisted string transmission. Also, other portions of the string may be worn.

Having strings of a larger diameter will increase the lifetime of the string but would require more torque by either a larger motor or a gear reduction which increases cost. Diverse ways of delimiting the life time problem of the strings are previously known, such as testing different kind of materials in the string or coating the string in order to minimise the abrasion. Another way has been to use a special split comprising two pulleys to minimise the abrasion, see U.S. Pat. No. 9,574,646 B1.

SUMMARY OF THE INVENTION

The aim of the present invention is to increase lifetime of the twisted string. The solution according to the present invention may appear simple but is ingenious and very effective.

According to an aspect of the invention a twisted string transmission for converting a rotational motion to a linear motion is provided. The twisted string actuator comprises a motor and a string to be connectable to a load. The string has a variable diameter along its length. By having a variable diameter along the length of the string in the twisted string transmission the string may have a larger diameter at the portions where abrasion is high. The string may have different diameters at different portions of the string. Preferably, the string has a larger diameter at least at an end connected to the motor and/or the string has a larger diameter at least at an end connected to a load, or if a split is provided between the motor and a load, the string has a larger diameter at least at the split.

A string is the part that connects the motor with the load. The string present between the motor and the load may be made up of one or several threads. If the string is made of one straight thread this thread will twist around its own length axis. According to an embodiment the transmission comprises a string having threads in more or less parallel, twisting around each other, between the motor and the load, or the split in case there is one. In one embodiment the string may be made up by two separate, parallel threads. Another embodiment provides that the string may be made up by means of one thread folded in double or being in a loop. It is also conceivable that more than one loop of threads are connected to each other making up the string, twisting around each other, between the motor and the load, or the split in case there is one.

According to an embodiment the string is made up of at least one thread that is braided, spun, monofilament or made up of parallel filaments or any combination thereof.

According to an embodiment a portion of the string having a larger diameter is at least 10% or preferably at least 30% larger, or most preferred at least 50% larger, than the other portions.

According to an embodiment the variable diameter of the string is provided by means of at least two different diameter threads united into one string. For example, the at least two different diameter threads are united by means of a knot, melting, braiding, adhesive or in any other suitable way. The at least two different diameter strings may be united by means of the threads being loops having different diameters and that they are interconnected by having one of the loops to go through the other loop.

According to an embodiment the variable diameter of the string is provided by means of integrated fibres or filling material in the at least one thread in at least one portion having larger diameter.

SHORT DESCRIPTION OF THE DRAWINGS

The present invention will now be described in more details under referral to the accompanying drawings, in which:

FIG. 1a shows a twisted string transmission of known art,

FIG. 1b shows a twisted string transmission of known art having a split,

Figure 3A:
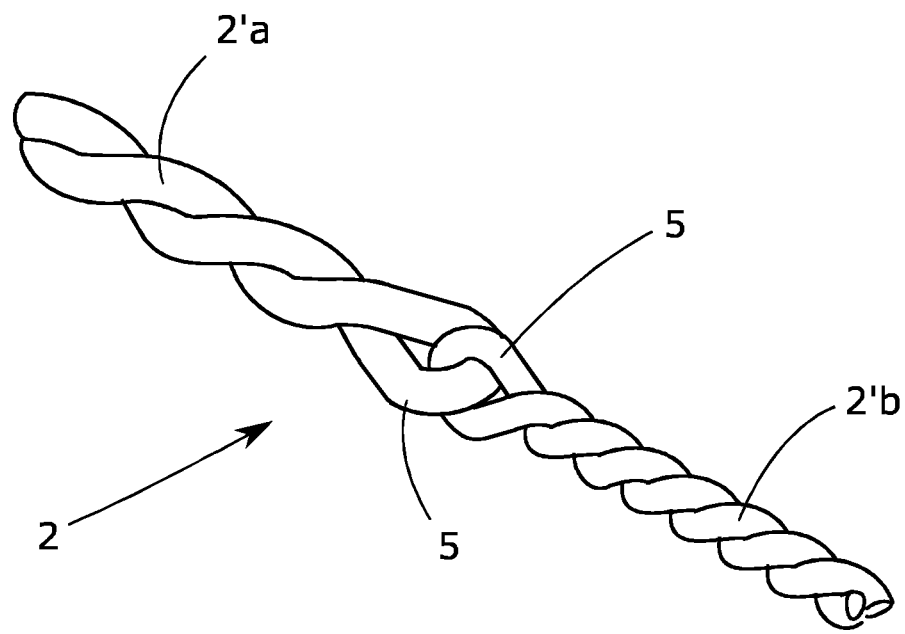
Figure 3B:
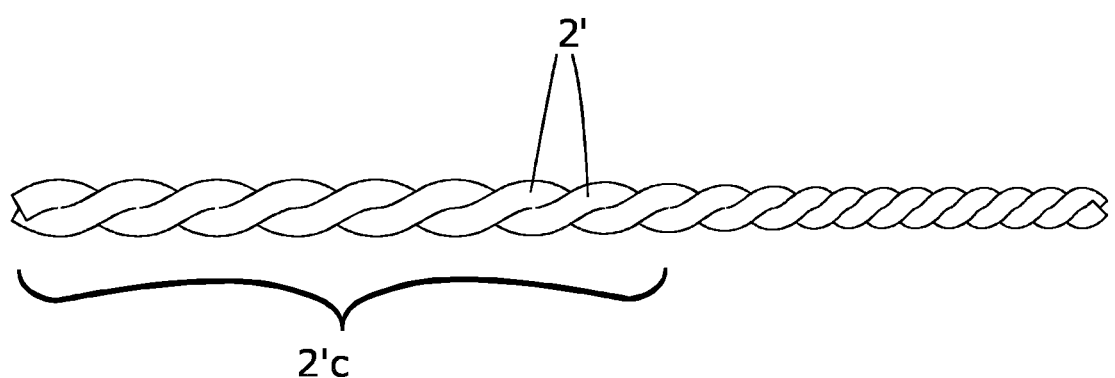
Figure 4A:
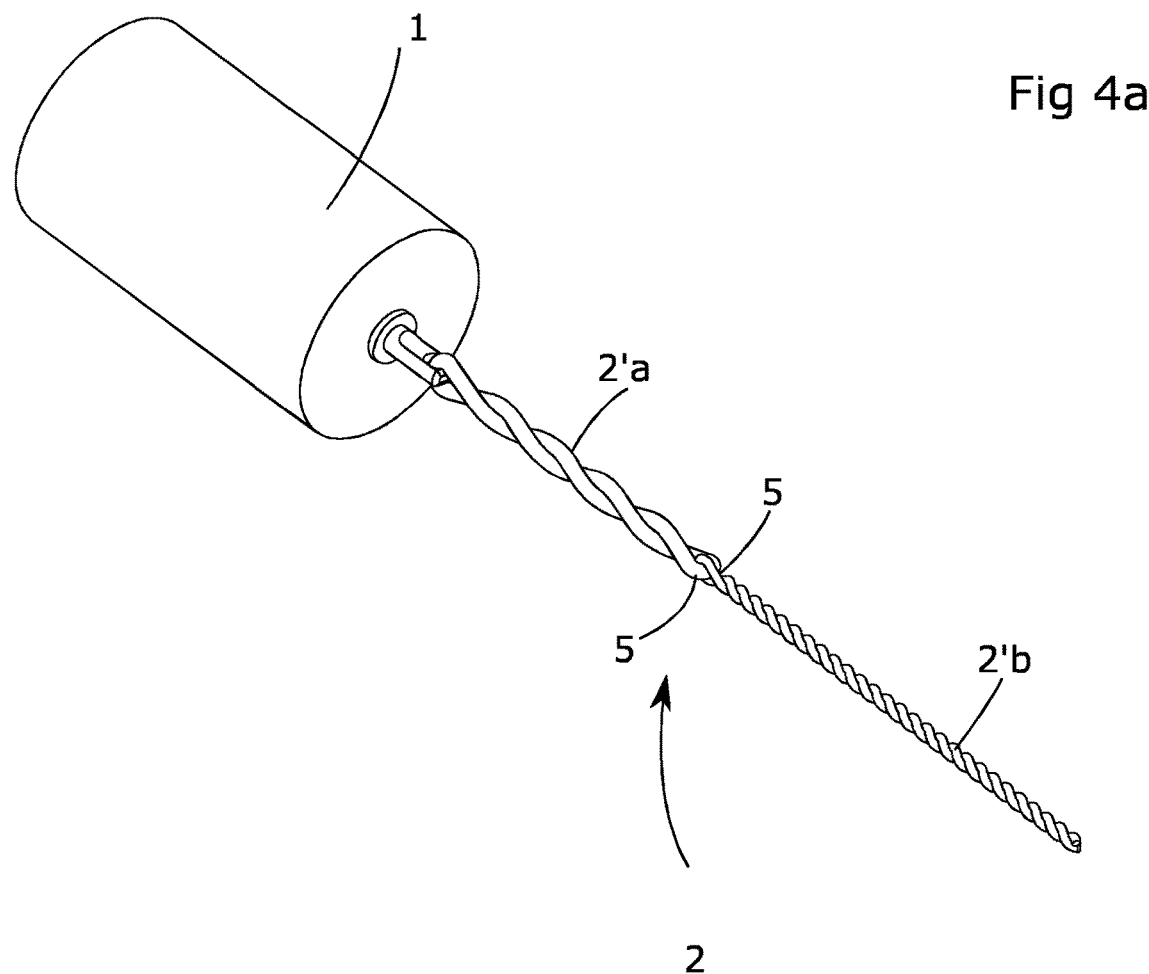
Figure 4B:
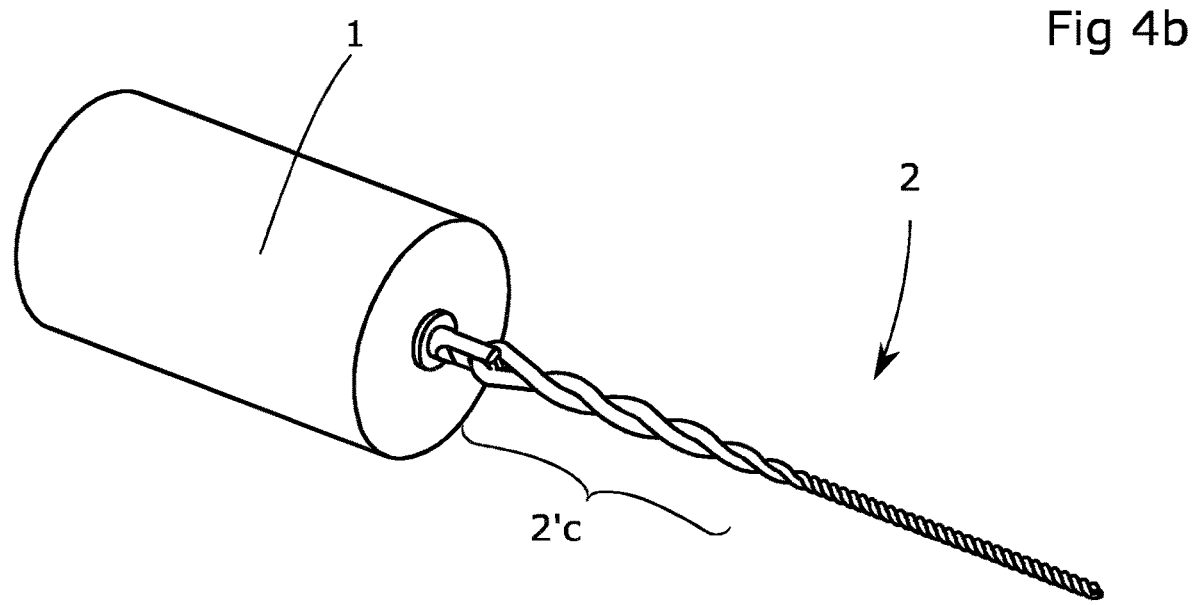
Figure 5A:
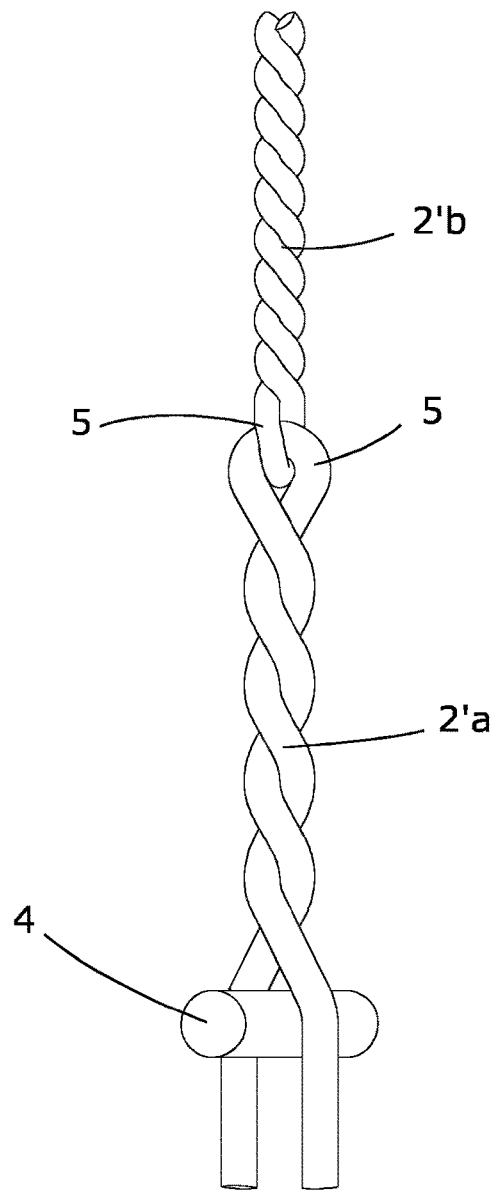
Figure 5B:
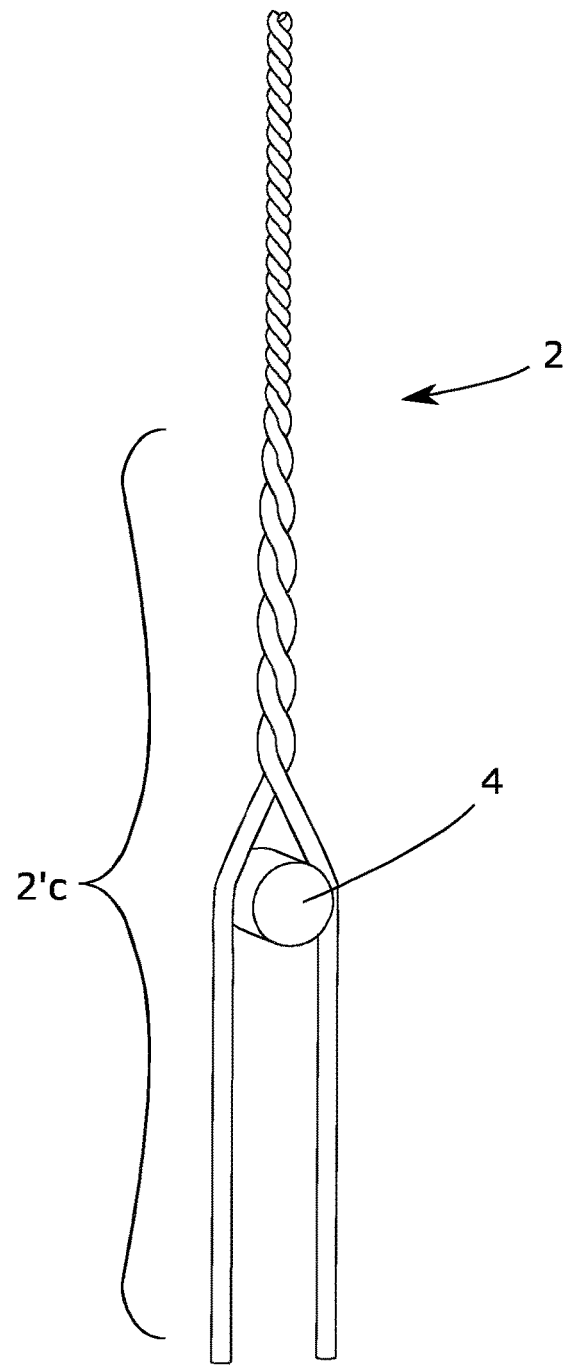

FIG. 2a-f show a twisted string transmission with different embodiments of the string, FIG. 3a shows a twisted string according to an embodiment of the present invention having variable diameter, FIG. 3b shows a twisted string according to an embodiment of the present invention having variable diameter, FIG. 4a shows a connection of an embodiment of a twisted string of the present invention when connected to a motor, FIG. 4b shows a connection of an embodiment of a twisted string of the present invention when connected to a motor, FIG. 5a shows a twisted string according to an embodiment of the present invention having variable diameter at a split, and FIG. 5b shows a twisted string according to an embodiment of the present invention having variable diameter at a split.

DETAILED DESCRIPTION OF EMBODIMENTS

In FIG. 1a a twisted string transmission of known art is shown. It comprises a motor 1, which is rotating a string 2, in the shown case the string comprises two threads 2', twisting around each other. The string 2 is connected to the motor 1 in a first end of the string 2. A second end of the string 2 is connected to a load 3. The twisted string transmission converts rotating motion to a linear motion, i.e. when the motor 1 twists the string 2 the distance between the motor 1 and the load 3 will become shorter and when the motor 1 untwists the string 2 the distance between the motor 1 and the load 3 will become longer. The use of a twisted string transmission is for pulling a load. For example, it may be used for a force enhancing glove where the string or strings would work as an artificial tendon making it possible to apply gripping force when the string is twisted.

In FIG. 1b a twisted string transmission of known art is shown comprising also a split 4. The split separates the two threads 2' so that the threads 2' will not be twisted on the side of the split 4 facing the load 3.

The embodiments of the present invention will mostly be described with two threads, twisting around each other, although it is possible to have only one thread or more than two threads in a twisted string transmission according to the invention. A selection of different possible embodiments of the string 2 is shown in FIG. 2a-f. Obviously other embodiments are possible, too, as long as they fall within the scope of the claims.

In FIG. 2a the string 2 is made up of one thread 2' is folded into a loop. The thread 2' has a portion with larger diameter, for example at the motor 1 and/or load 3. FIG. 2b shows a string 2 made up by two different threads 2' where both are in the form of loops interconnected with each other. In this embodiment the thread 2' closest to the motor 1 has a larger diameter than the other thread 2'. In FIG. 2c three threads 2' are used where the shorter threads 2' closest to the motor 1 and load 3, respectively, have larger diameter compared to the thread 2' in between. In FIG. 2d another embodiment having three threads 2' is shown. In this case the larger diameter of the string 2 is provided by means of more than one loop of the threads 2' closest to the motor 1 and load 3, respectively. In FIG. 2e three threads 2' are used where the two threads 2' closest to the motor 1 and load 3, respectively, have larger diameter than the thread 2' in between. In this embodiment is the thread 2' in between the threads 2' of larger diameter looped twice. In FIG. 2f an embodiment having three threads 2' are shown where the closest to the motor 1 and load 3, respectively, have larger diameter than the thread 2' in between. The thread 2' in between is not folded or looped but straight and its ends are connected to the threads 2' of larger diameter. In the shown embodiment the connection is made by a small loop 6, although other possible ways of connection may be used.

In FIG. 3a an embodiment of a string 2 having a variable diameter along its length for a twisted string transmission according to the invention is shown. The string 2 is made up by two different threads 2'a and 2'b having different diameters. In this embodiment a first thread 2'a having a larger diameter is made into a loop by folding the first thread 2'a once. Also, a second thread 2'b having a smaller diameter is made into a loop by folding it once. A looped end 5 is formed in each thread 2'a and 2'b. The loops 5 interconnect so that the first and second thread 2'a, 2'b hook into the loop ends 5 of each other. Each thread 2'a, 2'b has an open end for attachment with, for example, a motor 1 and a load 3, respectively. It is also possible to unite the open ends.

It is also possible to have a first thread 2'a of a first diameter connected to a second thread 2'b of a second diameter by means of a knot, braiding, melting, adhesives and other conceivable ways of uniting the ends of the first 2'a and the second thread 2'b. The first and second thread 2'a, 2'b forms two parallel (possibly twisted) threads 2' for the twisted string transmission of the invention.

In FIG. 3b another embodiment of a string 2 having a variable diameter along its length for a twisted string transmission according to the invention is shown. Two threads 2' are shown in this embodiment. Here the diameter varies along the length of a thread 2'. This can be accomplished by means of making the thread 2' with more strands in at least a portion 2'c of the thread 2' or using different diameters of the strands in different portions 2'c of the thread 2', thus increasing the diameter of the thread 2' in at least one portion 2'c. It is also possible to make the thread 2' having a core where the strands of the thread enclose the core. The portion 2'c having a larger diameter may slowly change into a smaller diameter size of the thread 2' or change abruptly in a short distance.

In FIG. 4a an attachment of a twisted string 2 to a motor 1 is shown. Since the portion of the twisted string 2 closest to the motor 1 or load 3 (not shown) is subjected to the most abrasion and wear, this portion should preferably be of a thread 2'a having a larger diameter according to any of the above described embodiments. Of course, as is shown in FIG. 4b, it is possible to have a thread 2' where the diameter varies along the length of the one and same thread as described above. In this embodiment in FIG. 4b the portion 2'c having a larger diameter is closest to the motor 1 or the load 3, not shown.

When using a split 4 a portion of the threads 2' coming into contact with the split 4 is subjected to the most abrasion and wear instead of the attachment to the load 3. In FIG. 5a a portion of the threads 2' coming into contact with the split 4 is a thread 2'a having a larger diameter according to any of the above described embodiments. Of course, as is shown in FIG. 5b, it is possible to have a thread 2' where the diameter varies along the length of the one and same thread as described above. In this embodiment in FIG. 5b the portion 2'c having a larger diameter is, at least, closest to the split 4.

Preferably, the string 2 for a twisted string transmission according to the invention, comprises a portion 2'c of the string 2 or the portion comprising at least a thread 2'a having a larger diameter both at the motor 1 and the load 3, or at the split 4 instead in case a split 4 is used.

The portion 2'c of the string 2 or the portion comprising at least a thread 2'a having a larger diameter will not twist as many times as the remainder of the thread 2'. This can be seen throughout the figures.

Changing the diameter along the string affects the lifetime of the string to a high degree. Below a general description of the behavior will described. It will be shown with a string made up of two threads with radius r twisted around each other.

Assume that wear removes material in proportion to energy density, i.e. to pressure and relative motions between surfaces. The relative motion is not clearly affected by radius, but pressure in contact between the threads will depend linearly on the curvature of the thread and inversely to the width of the contact between the threads, i.e. 1/r. The curvature of the thread is also proportional to 1/r so pressure is proportional to $1/r^2$. Since wear is proportional to pressure, wear is proportional to $1/r^2$. The depth that can be worn off before break is proportional to r. Hence lifetime is proportional to r/wear and lifetime should thus be proportional to $1/r^3$. That means that if one portion of the string has double diameter it should have a life time 8 times the lifetime of the rest of the string.

This is of course a simplified analysis, but there are additional factors working in favor of prolonged lifetime with an increased radius such as:
- Increased radius results in lower total force for each thread to handle.
- Increased radius increases the length of one twisted turn which in itself decreases the curvature causing pressure.
- In most cases, a larger radius causes lower relative motions in the string.

But it is preferred not to have too long portions of the string with a larger radius. If the relative radius is too large that portion of the string does not contribute to the actuation and therefore it could be said to shortening the string. A shorter string is undesirable because it adds to non-linearities of the actuation. So, the portions with larger diameter should not be chosen having a larger diameter than necessary. This would be possible considering the strong relationship between radius and lifetime.

The invention claimed is:

1. A twisted string actuator that converts rotational motion to linear motion, comprising:
    a motor that generates the rotational motion; and
    a string having threads that are substantially parallel and twist about each other between the motor and a load, the string having different thread diameters at different portions of the string along its length between the motor and the load, wherein the string connects to the motor at a first end thereof and the load at a second end thereof, and the actuator is without a split between the motor and the load that engages the threads and separates the threads in a direction transverse to a longitudinal axis of the string.

2. The twisted string actuator according to claim 1, wherein the string has a larger diameter at least at the first end connected to the motor.

3. The twisted string actuator according to claim 1, wherein the string has a larger diameter at least at the second end connected to the load than at another portion of the string.

4. The twisted string actuator according to claim 1, wherein at least one of the threads is braided, spun, monofilament or made up of parallel filaments.

5. The twisted string actuator according to claim 4, wherein at least two of the threads are parallel to each other.

6. The twisted string actuator according to claim 1, wherein a portion of the string has at least a 10% larger diameter than a smaller diameter portion.

7. The twisted string actuator according to any claim 1, wherein the variable diameter of the string is provided by of at least two of the threads having different diameters that are united into the string.

8. The twisted string actuator according to claim 7, wherein the at least two different diameter threads are united by the threads being loops and that they are interconnected by one of the loops passing through the other loop.

9. The twisted string actuator according to claim 7, wherein the at least two different diameter threads are united by a knot, melting, braiding, adhesive or original fabrication.

10. The twisted string actuator according to claim 1, wherein the diameter of one of the threads varies along the length of that thread.

11. A twisted string actuator for converting rotational motion to linear motion, comprising:
    a motor that generates the rotational motion; and
    a string that comprises three looped sections, including a first section adjacent the motor, a second section adjacent a load, and a third section between the first and second sections, and wherein each of the first section and the second section comprise more than one loop of threads, respectively.

12. The twisted string actuator according to claim 11, wherein the third section comprises one loop of the threads.

13. The twisted string actuator according to claim 11, wherein the first section and the second section have larger diameters that the third section.

14. The twisted string actuator according to claim 1, wherein a portion of the string has at least a 30% larger diameter than a smaller diameter portion.

15. A twisted string actuator that converts rotational motion to linear motion for moving a load, comprising:
    a motor that generates the rotational motion;
    a split; and
    a string having threads that are substantially parallel and twist around each other between the motor and the split, the split located between the threads of the string and precludes twisting of the threads around each other between the split and the load, and wherein the string has different thread diameters at different portions of the string along its length between the motor and the split.

16. The twisted string actuator according to claim 15, wherein the string has a larger diameter at a connection of the string to the motor than at another portion of the string.

17. The twisted string actuator according to claim 15, wherein the string has a larger diameter at a portion of the string that engages the split.

18. The twisted string actuator according to any claim 15, wherein the variable diameter of the string is provided by at least two of the threads having different diameters that are united into the string.

19. The twisted string actuator according to claim 18, wherein the at least two different diameter threads are united by the threads being loops and that they are interconnected by one of the loops passing through the other loop.

* * * * *